United States Patent
Rosich et al.

(10) Patent No.: US 9,876,531 B2
(45) Date of Patent: Jan. 23, 2018

(54) SYSTEM AND METHOD FOR REDUCING INTERFERENCE IN OFDM CHANNELS

(71) Applicant: Casa Systems, Inc., Andover, MA (US)

(72) Inventors: Douglas Rosich, North Reading, MA (US); Weidong Chen, Boxborough, MA (US); Tao Yu, Andover, MA (US)

(73) Assignee: Casa Systems, Inc., Andover, MA (US)

( * ) Notice: Subject to any disclaimer, the term of this patent is extended or adjusted under 35 U.S.C. 154(b) by 0 days.

(21) Appl. No.: 15/189,381

(22) Filed: Jun. 22, 2016

(65) Prior Publication Data
US 2017/0373716 A1  Dec. 28, 2017

(51) Int. Cl.
*H04B 3/32* (2006.01)
*H04L 27/26* (2006.01)
*H04L 12/28* (2006.01)

(52) U.S. Cl.
CPC .......... *H04B 3/32* (2013.01); *H04L 12/2801* (2013.01); *H04L 27/2649* (2013.01)

(58) Field of Classification Search
CPC .... H04B 3/32; H04L 12/2801; H04L 27/2649
See application file for complete search history.

(56) References Cited

U.S. PATENT DOCUMENTS

| | | | |
|---|---|---|---|
| 2013/0208632 A1* | 8/2013 | Williams | H04L 5/14 370/279 |
| 2014/0169431 A1 | 6/2014 | Arambepola et al. | |
| 2014/0219293 A1* | 8/2014 | Williams | H04L 5/0005 370/468 |
| 2017/0019347 A1* | 1/2017 | Al-banna | H04L 5/0007 |

OTHER PUBLICATIONS

International Search Report of the International Searching Authority dated Jul. 26, 2017, issued in connection with International Application No. PCT/US17/38768 (5 pages).
Written Opinion of the International Searching Authority dated Jul. 26, 2017, issued in connection with International Application No. PCT/US17/38768 (3 pages).

* cited by examiner

*Primary Examiner* — Vineeta Panwalkar
(74) *Attorney, Agent, or Firm* — McCarter & English, LLP

(57) ABSTRACT

A system and method for signal processing in a cable modem termination system (CMTS) is provided. A CMTS receiver in communication with a plurality of cable modems at a upstream signal or a cable modem receiver in communication with the CMTS at a downstream signal. A plurality of Advanced Time Division Multiple Access ("ATDMA") channel processors include a filter for recovering an ATDMA signal and a Orthogonal Frequency Division Multiplexing ("OFDM") channel processor includes a filter for processing a combined OFDM and ATDMA signal. A summation module subtracts the ATDMA signal from the combined ATDMA and OFDM signal to obtain a clean OFDM signal.

27 Claims, 6 Drawing Sheets

FIG. 1. – PRIOR ART

SYSTEM AND METHOD FOR REDUCING INTERFERENCE IN OFDM CHANNELS

BACKGROUND

Field of the Disclosure

The present disclosure relates generally to systems for improving communications in cable modem and other systems. More specifically, the present disclosure relates to system and method for reducing interference in ODFM channels.

Related Art

Cable modems (CMs) can be found in both homes and businesses, and are used to transmit and receive digital information (e.g., to access the Internet, view television, and/or view on-demand video, etc.). Numerous CMs can communicate with a device known as a Cable Modem Termination System (CMTS), which is installed at a central location and used to transmit information to CMs, as well as receive information from CMs. The signal between these devices traverses a communications network that includes both coaxial cable and fiber optic cable, and is known as a Hybrid Fiber-Coax (HFC) network or cable "plant." The HFC allows for bi-directional communication between the CMTS and the CMs. The protocol used to communicate between the CMTS and CMs has been standardized by the CableLabs organization and is collectively known as DOCSIS (Data Over Cable Service Interface Specifications). The set of DOCSIS specifications define all levels of communication including the physical layer, media access control layer, and an application interface layer.

Typically, many CMs share the bandwidth of a single coaxial cable, which usually has a bandwidth of approximately 1 GHz. The 1 GHz spectrum is divided into multiple channels. Each defined channel is typically shared by many CMs. In the downstream direction, from the CMTS to the CM, the CMTS will use time division multiplexing to send data to all CMs using a unique address to send data to a unique CM. In the upstream direction, from the CMs to the CMTS, many CMs must share the same channel. To accomplish this, the CMTS schedules time slots for each CM known as "MAPs." A given CM is only allowed to send data during its assigned time slot and assigned frequency mini slots. Synchronization signals from the CMTS to the CM keep the different CMs synchronized.

The HFC plant is subject to many different types of impairments that can degrade the quality of the signal. This is especially true in the upstream direction, where noise contributions from many CMs and households combine. These impairments are typically caused by problems such as loose or corroded connections, unterminated lines, faulty equipment, and other noise caused by sources such as motors and lightning. The DOCSIS specification provides a number of different tools to address the most common types of impairments such as: a variety of quadrature amplitude modulation (QAM) constellations; different channel widths; Reed-Solomon Forward Error Correction (R-S FEC); pre-equalization; interleaving; Advanced Time Division Multiple Access ("ATDMA") (DOCSIS 3.0); and Orthogonal Frequency Division Multiplexing ("OFDM") (DOCSIS 3.1). By manually varying these parameters, a cable operator can seek to improve signal quality, making tradeoffs between throughput and improved noise immunity.

DOCSIS 3.1 is the new standard for Data-Over-Cable-Service. OFDM technology is first implemented in cable data transfer. During the conversion from DOCSIS 3.0 to DOCSIS 3.1, OFDM and ATDMA signals may exist in the same plant for backward compatibility. The need to support a DOCSIS 3.0 modem will last for many years. Both theoretical simulations and field tests show that once the OFDM fast Fourier transform is performed on the combined signals, the ATDMA signal will have significant spectral spread to each side of the signal in the frequency domain due to a rectangular window function being applied to the OFDM fast Fourier transform function. This will cause a spectral region of 8-10 MHz on each side of the ATDMA signal to be unusable by OFDM carriers, which is unacceptable.

For example, FIG. 1 illustrates a prior art version of the current system. RF signal 10 is received by the analog-to-digital converter 12. The analog-to-digital converter 12 outputs the signal to a plurality ATDMA channel processors 14a-14n. Each of the ATDMA channel processors 14a-14n are identical in the signal processing methods that are employed. The output of the analog-to-digital converter 12 first goes to mixers 16a-16n to shift the signal to a common known frequency, which moves the selected ATDMA channels to a baseband. The outputs from the mixers 16a-16n are then received by filters 18a-18n to recover the ATDMA signal from either combined signals or adjacent ATDMA signals. The clean ATDMA outputs from filters 18a-18n are then received by modules 20a-20n for timing and carrier recovery. The outputs are then received by time domain equalizers 22a-22n for reconstructing the QAM signal. Finally, the outputs from equalizers 22a-22n are received by slicers 24a-24n for eliminating a portion of the signal to obtain the output ATDMA signals 26a-26n.

The analog-to-digital converter 12 also outputs the signal to a OFDM channel process 30. The output of the analog-to-digital converter 12 first goes to a mixer 32 to shift the signal to a common known frequency, which moves the whole OFDM channel to baseband. The baseband channel is up to 95 MHz in bandwidth in DOCSIS 3.1 upstream and up to 190 MHz in bandwidth in DOCSIS 3.1 downstream. The output from the mixer 32 is then received by a filter 34 to obtain a clean OFDM signal from combined signals or OFDM only signals. The output from the filter 34 is then received by a module 36 for fast Fourier transformation. The output is then received by an equalizer 38 for adjusting the amplitude and reconstructing the signal. Finally, the output from the equalizer 38 is received by a slicer 40 for eliminating a portion of the signal to obtain the output OFDM signal 42. However, the output OFDM signal 42 and the output ATDMA signal 26 may exist in the same plant, and as such, may interfere with each other. Therefore, there exists a need to improve the signal processing in these systems, so that the presence of ATDMA and OFDM signals together do not result in interference and decreased performance.

SUMMARY

The present disclosure relates to a system for signal processing in a cable modem termination system (CMTS). The present disclosure also applies to CMs when the CMs need to receive a combined QAM and OFDM signal in a downstream signal. The system includes a CMTS receiver in communication with a plurality of cable modems. The system also includes a plurality of ATDMA channel processors including a filter for recovering an ATDMA signal. The system further includes an OFDM channel processor including a filter for processing a combined OFDM and ATDMA signal. Finally, the system also includes a summation module for subtracting the ATDMA signal from the combined ATDMA and OFDM signal to obtain a clean OFDM signal.

In another embodiment, a method for signal processing in a cable modem termination system (CMTS) is provided. The method includes the steps of providing a CMTS receiver in communication with a plurality of cable modems; providing a plurality of ATDMA channel processors including a filter; recovering a ATDMA signal; providing an OFDM channel processor including a filter for processing a combined OFDM and ATDMA signal; and subtracting the ATDMA signal from the combined ATDMA and OFDM signal using a summation module to obtain a clean OFDM signal.

In another embodiment, a non-transitory, computer-readable medium having computer readable instructions stored thereon is provided. The instructions, when executed by a cable modem termination system (CMTS) receiver in communication with a plurality of cable modems, cause the receiver to perform the steps comprising: providing a plurality of ATDMA channel processors including a filter; recovering an ATDMA signal; providing an OFDM channel processor including a filter for processing a combined OFDM and ATDMA signal; and subtracting the ATDMA signal from the combined ATDMA and OFDM signal using a summation module to obtain a clean OFDM signal.

BRIEF DESCRIPTION OF THE DRAWINGS

The foregoing features of the disclosure will be apparent from the following Detailed Description, taken in connection with the accompanying drawings, in which.

DETAILED DESCRIPTION

The present disclosure relates to a system and method for signal processing in communications systems, as discussed in detail below in connection with FIGS. 2-6.

Figure 1:
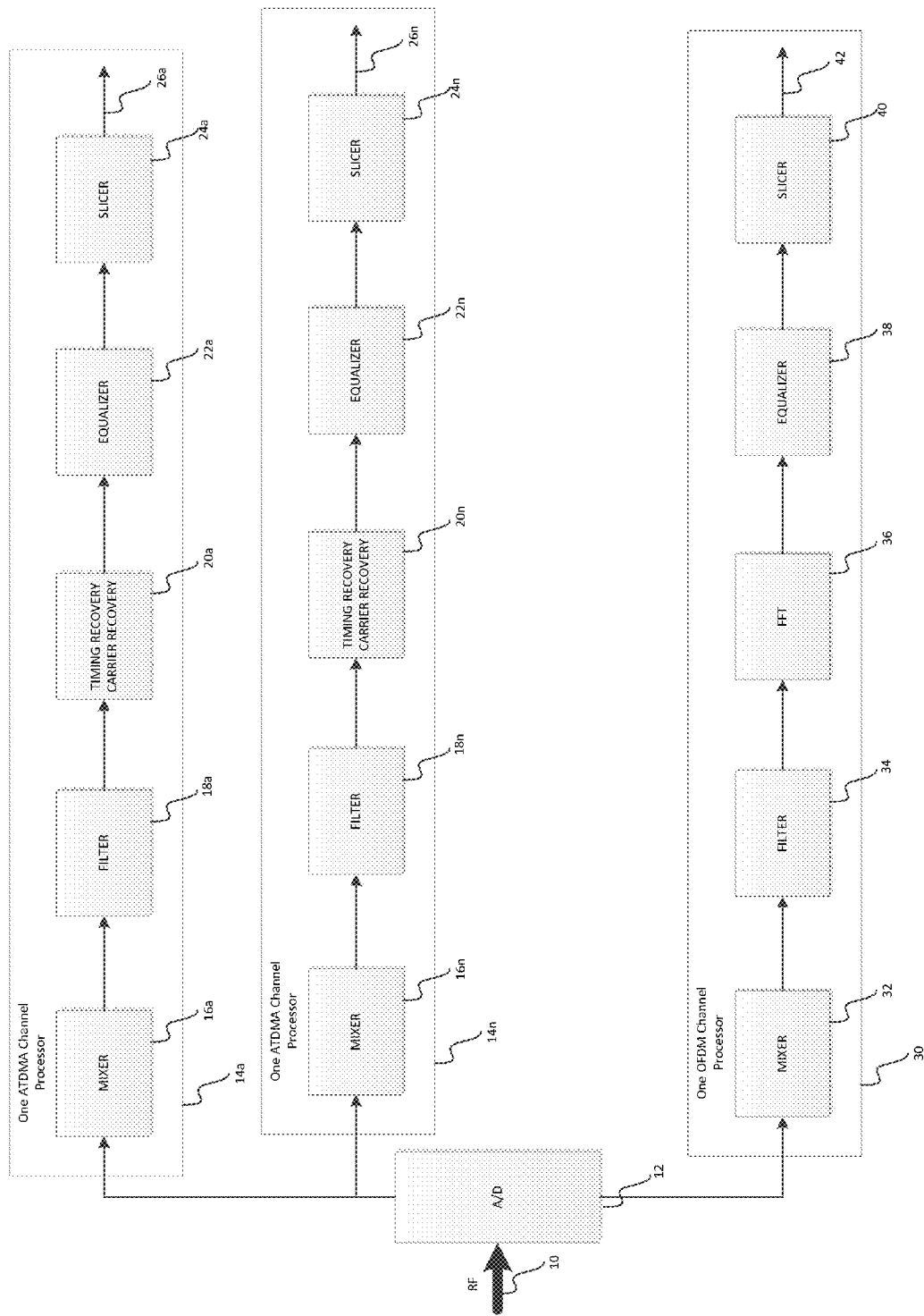
FIG. 1 is a diagram of a prior art CMTS receiver system.
Figure 2:
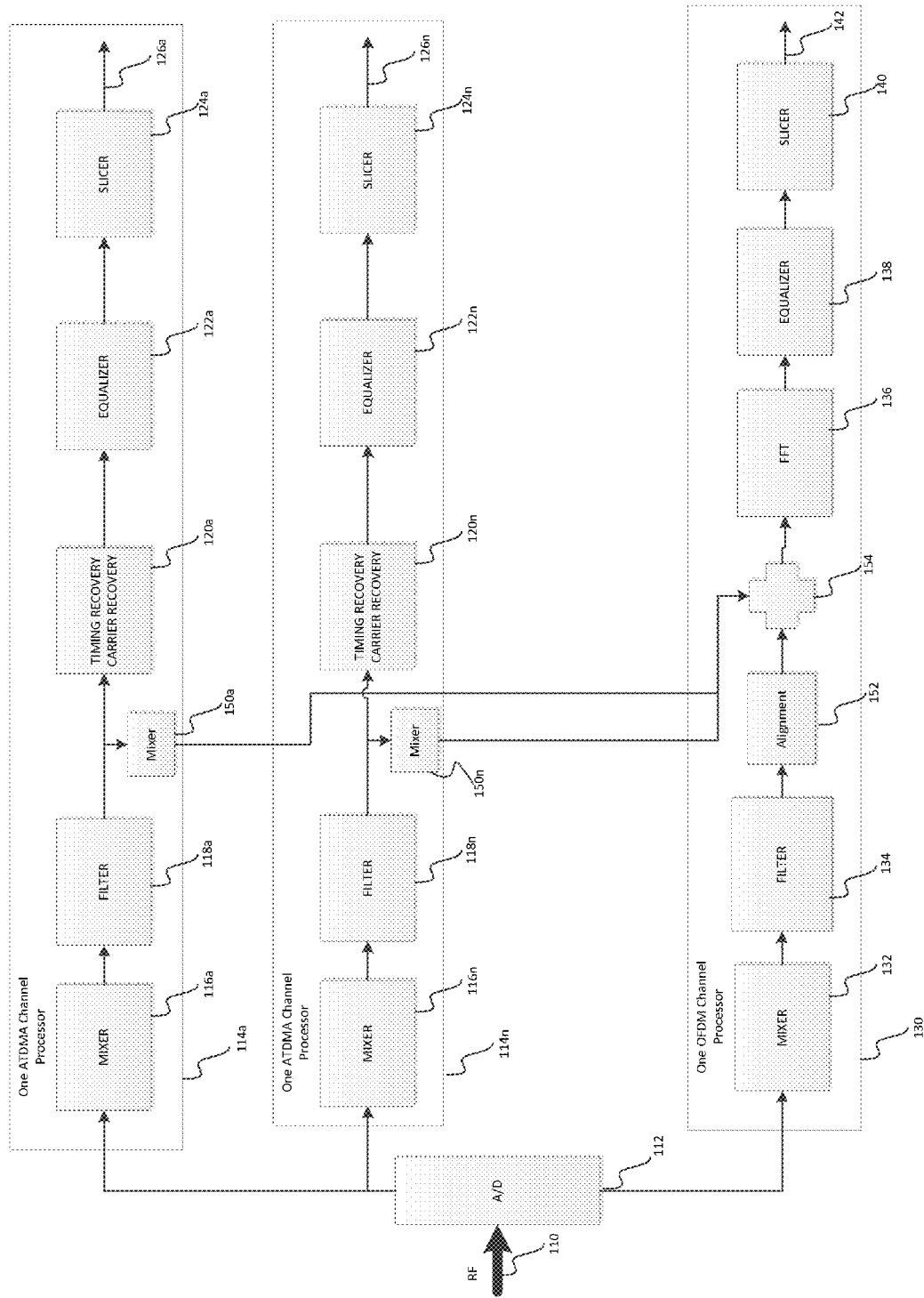
FIG. 2 is a diagram illustrating a CMTS receiver system in accordance with the present disclosure which supports both ATDMA and OFDM signals.

Referring to FIG. 2, a block diagram of the system of the present disclosure will be explained in greater detail. RF signal 110 is first received by an analog-to-digital converter 112 which converts the analog signal into a digital signal. After the analog-to-digital converter 112 converts the analog signal to the digital signal, the ATDMA and combined ATDMA/OFDM signals are processed in different channels. For example, ATDMA signals are processed by a plurality of ATDMA channel processors 114-114n. Each of the ATDMA channel processors 114a-114n are identical in the signal processing methods that are employed. The output of the analog-to-digital converter 112 first goes to mixers 116a-116n to shift the signal to a common known frequency, which moves the selected ATDMA channels to a baseband. The outputs from the mixers 116a-116n are then received by filters 118a-118n to recover the ATDMA signals from either combined signals or adjacent ATDMA signals. The clean ATDMA outputs from filters 118a-118n are then received by modules 120a-120n for timing and carrier recovery. The outputs are then received by time domain equalizers 122a-122n for reconstructing the QAM signals. Finally, the outputs from the equalizers 122a-122n are received by slicers 124a-124n for eliminating a portion of the signals to obtain the output ATDMA signals 126a-126n. This process allows DOCSIS 3.0 systems to receive and process ATDMA signals 126a-126n.

Figure 3:
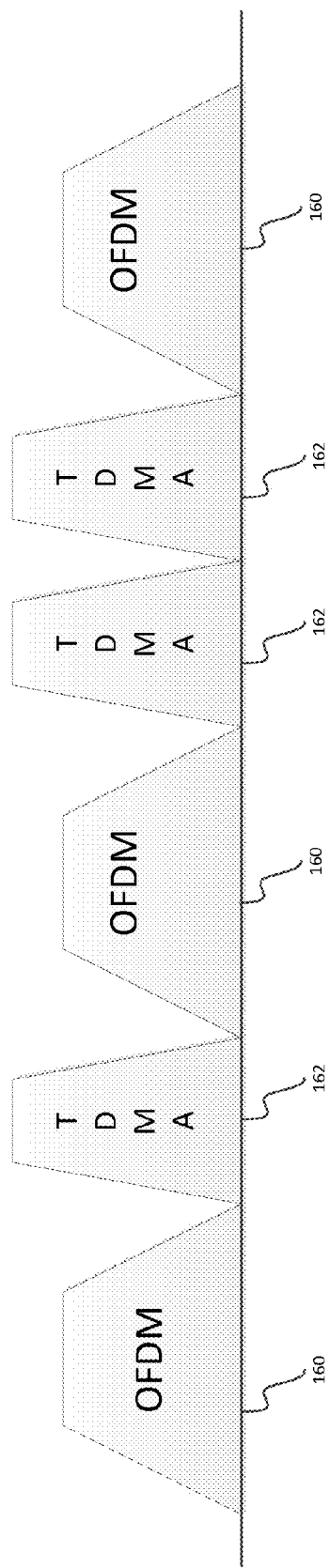
FIG. 3 is a diagram showing the combined TDMA and OFDM signal.
Figure 4:
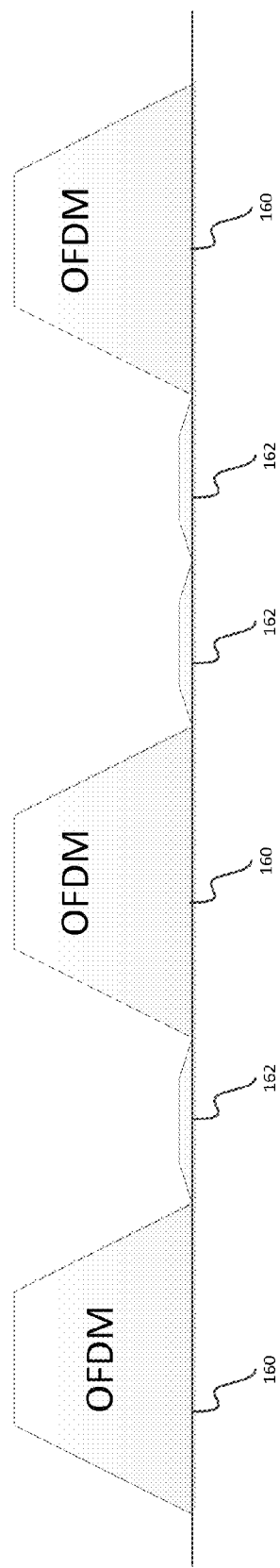
FIG. 4 is a diagram showing a clean OFDM signal after filtering by the system of the present disclosure.

The analog-to-digital converter 112 also outputs a combined ATDMA and OFDM signal to an OFDM channel processor 130. The output of the analog-to-digital converter 112 first goes to a mixer 132 to shift the signal to a common known frequency, which moves the whole combined signal channel to a baseband. As noted above, the baseband channel is up to 95 MHz in bandwidth in DOCSIS 3.1 upstream and up to 190 MHz in bandwidth in DOCSIS 3.1 downstream. The output from the mixer 132 is then received by a filter 134 to obtain a clean combined OFDM and ATDMA signal. The filter 134 can remove the band noise in the combined signal. The result is a combined signal including TDMA signals 162 and OFDM signals 160 as shown in FIG. 3. Alternatively, the filter 134 could recover a clean OFDM signal from combined signals or OFDM only signals. In statistic combined signal cases, additional filter parameters could be needed in filter 134 to remove all ATDMA signals. In dynamic combined cases, dynamic-adjustable filters could be utilized.

Figure 5:
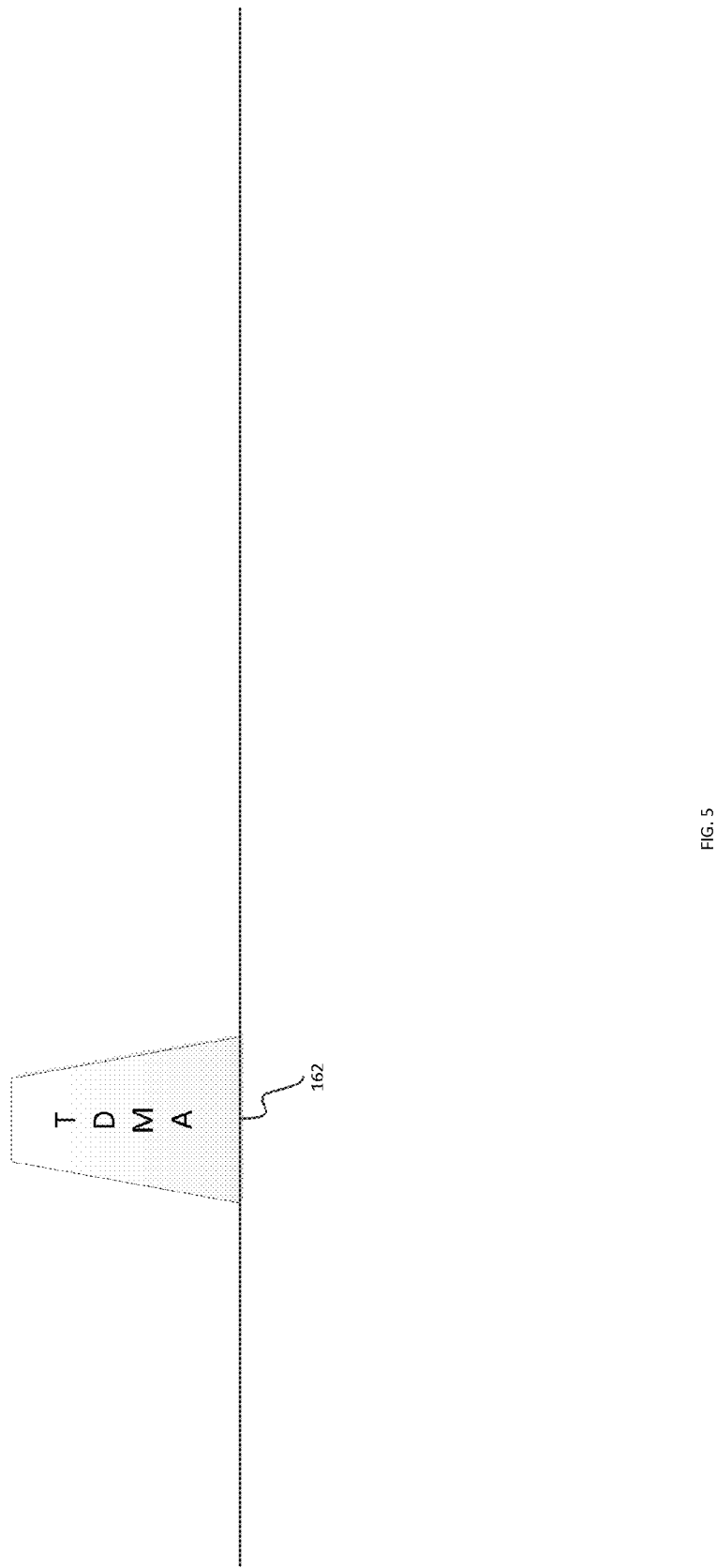
FIG. 5 is a diagram showing a clean TDMA signal after filtering by the system of the present disclosure.

As noted above, for each ATDMA channel processor 114, the filter 118 recovers the interfering signals. These signals are then received by a plurality of corresponding mixers 150a-150n, which are used to reconstruct the original interfering signals for all the ATDMA channels. An alignment module 152 aligns the combined OFDM and ATDMA signal with the interfering signals for all the ATDMA channels. Each of the plurality of the ATDMA channel processors 114a-114n know when and in which frequencies the ATDMA signals appear, and can provide in real-time the correct known ATDMA signals to the OFDM channel processor 130 and more specifically, the summation module 154. Therefore, the summation module 154 can use these known ATDMA signals to obtain clean OFDM signals by subtracting the known ATDMA signals from the combined signal found in FIG. 3. The result is a clean OFDM signal shown in FIG. 4. Additionally, a clean TDMA signal can be extracted as shown in FIG. 5. It should be noted that the system of the present disclosure can be used to cancel any interfering signal, not just ATDMA signals as previously described.

The output from the summation module 154 is received by a module 136 for fast Fourier transformation of the signal. The output is then received by an equalizer 138 for adjusting the amplitude and reconstructing the signal. Finally, the output from the equalizer 138 is received by a slicer 140 for eliminating a portion of the signal to obtain the output OFDM signal 142. The OFDM signal 142 is clean and does not contain any interference with ATDMA signals due to the summation module 154.

Figure 6:
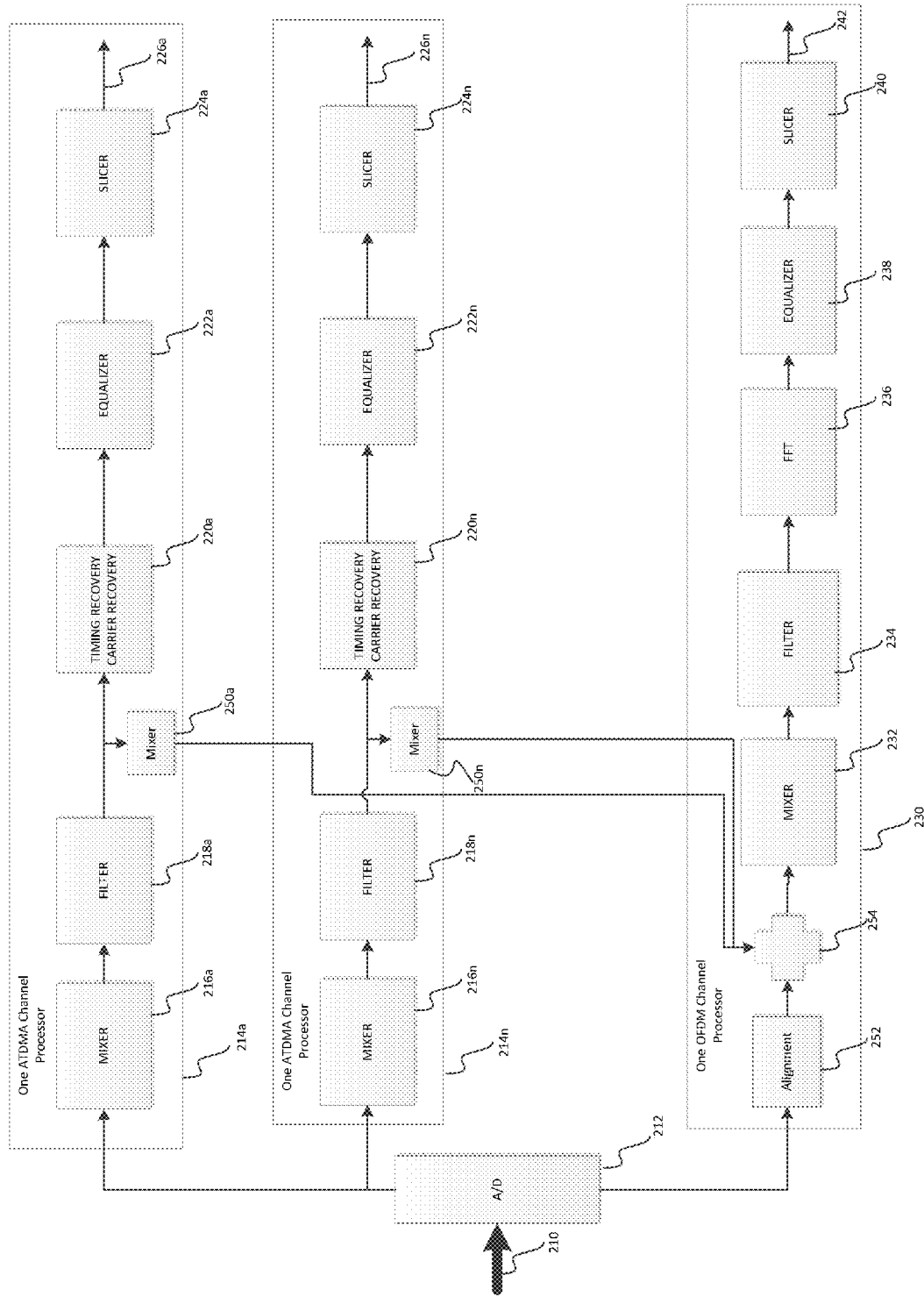
FIG. 6 is a diagram illustrating a CMTS receiver system in accordance with a second embodiment the present disclosure which supports both ATDMA and OFDM signals.

Reference will now be made to FIG. 6 showing an alternative embodiment of the disclosure of the present application. RF signal 210 is first received by an analog-to-digital converter 212 which converts the analog signal into a digital signal. After the analog-to-digital converter 212 converts the analog signal to the digital signal, the ATDMA and combined ATDMA/OFDM signals are processed in different channels. For example, ATDMA signals are processed by a plurality of ATDMA channel processors 214-214n. Each of the ATDMA channel processors 214a-214n are identical in the signal processing methods that are employed. The output of the analog-to-digital converter 212 first goes to mixers 216a-216n to shift the signal to a common known frequency, which moves the selected ATDMA channels to a baseband. The outputs from the mixers 216a-216n are then received by filters 218a-218n to recover the ATDMA signals from either combined signals or adjacent ATDMA signals. The clean ATDMA outputs from filters 218a-218n are then received by modules 220a-220n for timing and carrier recovery. The outputs are then received by time domain equalizers 222a-222n for reconstructing the QAM signals. Finally, the outputs from the equalizers 222a-222n are received by slicers 224a-224n for eliminating a portion of the signals to obtain the output ATDMA signals 226a-226n. This process allows DOCSIS 3.0 systems to receive and process ATDMA signals 226a-226n. As mentioned above, for each ATDMA channel processor 214, the filter 218 recovers the interfering signals. These signals are then received by a plurality of corresponding mixers 250a-250n, which are used to reconstruct the original interfering signals for all the ATDMA channels.

The analog-to-digital converter 212 also outputs a combined ATDMA and OFDM signal to an OFDM channel processor 230. The output of the analog-to-digital converter 212 first goes to an alignment module 252 for aligning the combined OFDM and ATDMA signal with the interfering signals for all the ATDMA channels, which are being sent from the mixers 250a-250n. Each of the plurality of the ATDMA channel processors 214a-214n know when and in which frequencies the ATDMA signals appear, and can provide in real-time the correct known ATDMA signals to the OFDM channel processor 230 and more specifically, the summation module 254. Therefore, the summation module 254 can use these known ATDMA signals to obtain clean OFDM signals by subtracting the known ATDMA signals from the combined signal found in FIG. 3. The result is a clean OFDM signal shown in FIG. 4. Additionally, a clean TDMA signal can be extracted as shown in FIG. 5. It should be noted that the system of the present disclosure can be used to cancel any interfering signal, not just ATDMA signals as previously described.

The clean OFDM signal as shown in FIG. 3 is then received by mixer 232 to shift the signal to a common known frequency, which moves the whole combined signal channel to a baseband. As noted above, the baseband channel is up to 95 MHz in bandwidth in DOCSIS 3.1 upstream and up to 190 MHz in bandwidth in DOCSIS 3.1 downstream. The output from the mixer 232 is then received by a filter 234 to obtain a clean OFDM signal. The filter 234 can remove the band noise in the signal. The output from the filter 234 is received by a module 236 for fast Fourier transformation of the signal. The output is then received by an equalizer 238 for adjusting the amplitude and reconstructing the signal. Finally, the output from the equalizer 238 is received by a slicer 240 for eliminating a portion of the signal to obtain the output OFDM signal 242. The OFDM signal 242 is clean and does not contain any interference with ATDMA signals due to the summation module 254.

Having thus described the system and method in detail, it is to be understood that the foregoing description is not intended to limit the spirit or scope thereof. It will be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

What is claimed is:

1. A system for signal processing in a cable modem termination system (CMTS) or a cable modem, comprising:
    a CMTS receiver in communication with a plurality of cable modems at an upstream signal or a cable modem receiver in communication with the CMTS at a downstream signal;
    at least one Advanced Time Division Multiple Access (ATDMA) channel processor including a filter for recovering an ATDMA signal;
    an Orthogonal Frequency Division Multiplexing (OFDM) channel processor including a filter for processing a combined ATDMA and OFDM signal; and
    a summation module for subtracting the ATDMA signal from the combined ATDMA and OFDM signal to obtain a clean OFDM signal.

2. The system of claim 1, further comprising a first mixer to move the ATDMA signal to a baseband.

3. The system of claim 2, further comprising a second mixer to move the OFDM signal to a baseband.

4. The system of claim 3, further comprising a module to perform timing and carrier recovery on the ATDMA signal.

5. The system of claim 4, further comprising a module to perform fast Fourier transformation on the clean OFDM signal.

6. The system of claim 5, further comprising a first equalizer to reconstruct a Quadtrature Amplitude Modulation (QAM) signal from the ATDMA channel processor.

7. The system of claim 6, further comprising a second equalizer to reconstruct a QAM signal from the OFDM channel processor.

8. The system of claim 7, further comprising a first slicer to remove a portion of the ATDMA signal from the ATDMA channel processor.

9. The system of claim 8, further comprising a second slicer to remove a portion of the clean OFDM signal from the OFDM channel processor.

10. A method for signal processing in a cable modem termination system (CMTS), comprising the steps of:
    providing a CMTS receiver in communication with a plurality of cable modems at an upstream signal or a cable modem receiver in communication with the CMTS at a downstream signal;
    providing at least one Advanced Time Division Multiple Access (ATDMA) channel processor including a filter;
    recovering an ATDMA signal;
    providing an Orthogonal Frequency Division Multiplexing (OFDM) channel processor including a filter for processing a combined ATDMA and OFDM signal; and
    subtracting the ATDMA signal from the combined ATDMA and OFDM signal using a summation module to obtain a clean OFDM signal.

11. The method of claim 10, further comprising the step of moving the ATDMA signal to a baseband using a first mixer.

12. The method of claim 11, further comprising the step of moving the OFDM signal to a baseband using a second mixer.

13. The method of claim 12, further comprising the step of performing timing and carrier recovery on the ATDMA signal.

14. The method of claim 13, further comprising the step of performing fast Fourier transformation on the clean OFDM signal.

15. The method of claim 14, further comprising the step of reconstructing a Quadtrature Amplitude Modulation (QAM) signal from the ATDMA channel processor using a first equalizer.

16. The method of claim 15, further comprising the step of reconstructing a QAM signal from the OFDM channel processor using a second equalizer.

17. The method of claim 16, further comprising the step of removing a portion of the ATDMA signal from the ATDMA channel processor using a first slicer.

18. The method of claim 17, further comprising the step of removing a portion of the clean OFDM signal from the OFDM channel processor using a second slicer.

19. A non-transitory, computer-readable medium having computer readable instructions stored thereon which, when executed by a cable modem termination system (CMTS) receiver in communication with a plurality of cable modems at an upstream signal or a cable modem receiver in communication with the CMTS at a downstream signal, cause the receiver to perform the steps comprising:
  providing at least one Advanced Time Division Multiple Access (ATDMA) channel processor including a filter;
  recovering a ATDMA signal;
  providing an Orthogonal Frequency Division Multiplexing (OFDM) channel processor including a filter for processing a combined ATDMA and OFDM signal; and
  subtracting the ATDMA signal from the combined ATDMA and OFDM signal using a summation module to obtain a clean OFDM signal.

20. The computer-readable medium of claim 19, further comprising instructions for causing the receiver to perform the step of moving the ATDMA signal to a baseband using a first mixer.

21. The computer-readable medium of claim 20, further comprising instructions for causing the receiver to perform the step of moving the OFDM signal to a baseband using a second mixer.

22. The computer-readable medium of claim 21, further comprising instructions for causing the receiver to perform the step of performing timing and carrier recovery on the ATDMA signal.

23. The computer-readable medium of claim 22, further comprising instructions for causing the receiver to perform the step of performing fast Fourier transformation on the clean OFDM signal.

24. The computer-readable medium of claim 23, further comprising instructions for causing the receiver to perform the step of reconstructing a Quadtrature Amplitude Modulation (QAM) signal from the ATDMA channel processor using a first equalizer.

25. The computer-readable medium of claim 24, further comprising instructions for causing the receiver to perform the step of reconstructing a QAM signal from the OFDM channel processor using a second equalizer.

26. The computer-readable medium of claim 25, further comprising instructions for causing the receiver to perform the step of removing a portion of the ATDMA signal from the ATDMA channel processor using a first slicer.

27. The computer-readable medium of claim 26, further comprising instructions for causing the receiver to perform the step of removing a portion of the OFDM signal from the OFDM channel processor using a second slicer.

* * * * *